US 6,679,357 B1

(12) United States Patent
Jenkinson

(10) Patent No.: US 6,679,357 B1
(45) Date of Patent: Jan. 20, 2004

(54) BRAKE ASSEMBLY WITH COOLING FINS

(75) Inventor: Scott Jenkinson, Davisburg, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 10/199,398

(22) Filed: Jul. 19, 2002

(51) Int. Cl.7 ............................................... F16D 65/10
(52) U.S. Cl. ............................ 188/218 R; 188/264 R
(58) Field of Search ........................ 188/218 R, 18 R, 188/264 R, 264 A, 264 AA, 78, 74, 218 A, 264 W; 192/113.23, 70.2, 85 AA; 301/6.3; D12/180; 74/434

(56) References Cited

U.S. PATENT DOCUMENTS 2,274,503 A * 2/1942 Reid ..................... 188/218 R
2,808,909 A * 10/1957 Lyon ..................... 188/264 W
D212,217 S * 9/1968 John ........................ D12/180
3,583,533 A 6/1971 Jones
3,889,786 A 6/1975 Schrader
4,621,715 A 11/1986 Denton
4,674,606 A 6/1987 Denton
4,989,697 A 2/1991 Denton
5,320,201 A 6/1994 White
5,826,684 A 10/1998 Hester
5,964,323 A 10/1999 Henry
6,264,012 B1 7/2001 Yamazaki

* cited by examiner

Primary Examiner—Douglas C. Butler
(74) Attorney, Agent, or Firm—Carlson, Gaskey & Olds

(57) ABSTRACT

A brake drum includes a plurality of ribs formed on an outer surface with each rib extending about the circumference of the drum. Recesses are formed between the ribs that also extend about the circumference of the drum. Wedges are secured between the ribs, within the recesses, to direct air flow away from the drum.

20 Claims, 2 Drawing Sheets

BRAKE ASSEMBLY WITH COOLING FINS

BACKGROUND OF THE INVENTION

This invention generally relates to a brake drum assembly with cooling fins for increasing the rate of heat transfer from the brake drum to the atmosphere.

Brake assemblies includes a rotating member such as a brake drum or brake disc that rotates with a vehicle wheel and a non-rotating member such as a brake shoe or brake pad that engages the rotating member to slow or stop the vehicle wheel. When the non-rotating member engages the rotating member, during a braking event, a significant amount of heat is generated. If this heat is not dissipated in an effective manner, premature heat cracks can be generated, which could cause premature wear or component failure.

For example, in lightweight brake drum applications, the brake drum has a ribbed design formed about the circumference of the drum. This rib design has been found to influence the wear pattern and temperature distribution of the drum. Between the ribs, less material is used in dispersing the heat, resulting from frictional contact of the brake lining against the inner surface of the drum, to the external atmosphere. This causes a bluing effect in the area between the ribs, which can result in the initiation of heat cracks.

Thus, a brake assembly design that more effectively dissipates heat generated at the brake assembly to the external atmosphere is desirable.

SUMMARY OF THE INVENTION

A brake assembly includes a rotating brake member that rotates about an axis of rotation and has an outer surface and an inner surface that comes into frictional contact with a brake lining supported by a non-rotating brake component. Ribs are formed about the periphery of the rotating brake member. Inserts are secured between the ribs to increase air movement between the ribs and to increase the rate of heat transfer from the rotating brake component to the atmosphere.

In one embodiment, the inserts are secured in recesses formed between the ribs. At least one insert is installed within each recess and preferably, multiple inserts are installed within each recess. The inserts can be secured within the recesses in groups, with each group being arcuately spaced apart from the next group and with each insert in a group being installed along a common linear path between ribs. Or, the inserts can be installed in a staggered pattern relative to each other.

In one embodiment, the inserts are wedge shaped and contact at least a portion of each rib between which the insert is installed. Also, the wedges can be installed at angles relative to the periphery of the brake component and/or perpendicular to the periphery of the brake component.

The subject invention provides a method and apparatus for more effectively dissipating heat generated during braking from a brake component to the atmosphere to improve component wear and heat distribution characteristics. These and other features of the present invention can be best understood from the following specifications and drawings, the following of which is a brief description.

DETAILED DESCRIPTION OF A PREFERRED EMBODIMENT

Figure 1:
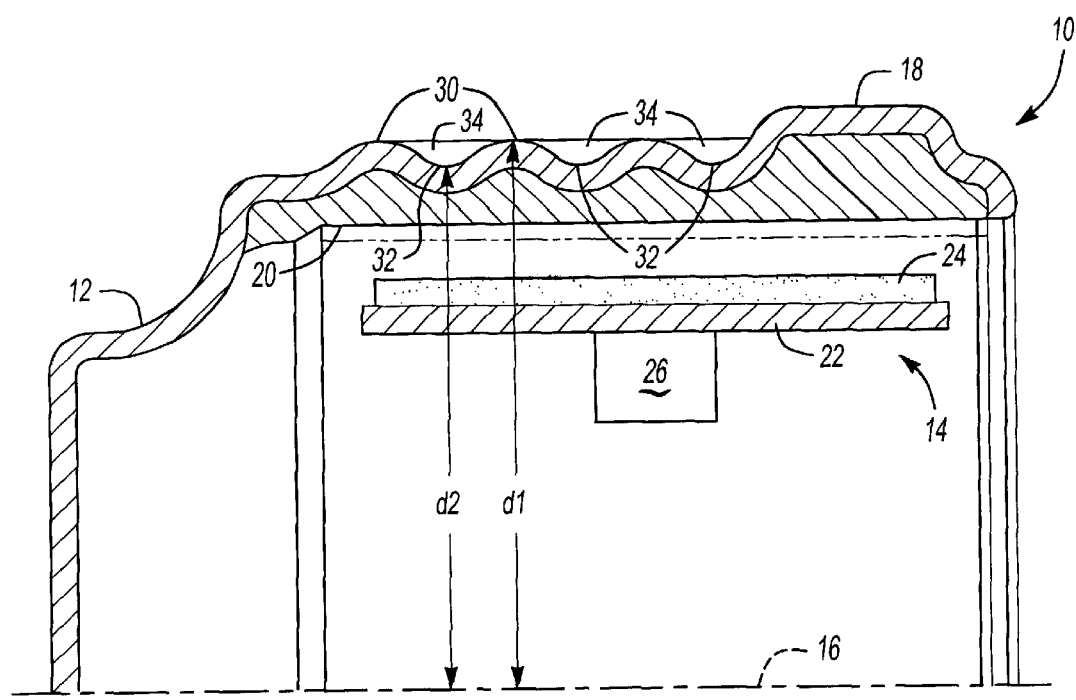
FIG. 1 is a cross-sectional view of a brake assembly incorporating the subject invention.

A brake assembly is shown generally at 10 in FIG. 1. The brake assembly includes a rotating brake component, such as a brake drum 12, and a non-rotating brake component, such as a brake shoe 14. The brake drum 12 is mounted to a vehicle wheel (not shown) for rotation about an axis of rotation 16. The brake drum 12 includes an outer surface 18 and an inner braking surface 20.

The brake shoe 14 includes a backing plate 22 that supports a brake lining 24. An actuating mechanism, shown schematically at 26, moves the brake shoe 14 toward the brake drum 12 during a braking even such that the brake lining 24 comes into contact with the inner braking surface 20 to slow or stop the vehicle wheel. Any type of actuating mechanism 26 known in the art can be used to move the brake shoe 14 into engagement with the brake drum 12.

Preferably, the brake drum 12 is a lightweight brake drum made from a composite material with a corrugated or ribbed external surface. The corrugated surface is formed by a plurality of ribs 30 is formed about the periphery of the outer surface 28 of the drum 12. The ribs 30 preferably extend continuously about the periphery of the drum 12 and are defined by a first radial distance d1 from the axis of rotation 16. Further, the ribs 30 are spaced apart from one another along a linear direction extending parallel to the axis of rotation 16.

Recesses or valleys 32 are formed between the ribs 30. The recesses 32 preferably extend continuously about the periphery of the drum 12 and are defined by a second radial distance d2 that is less than d1. The recesses 32 are also spaced apart from one another along a linear direction extending parallel to the axis of rotation 16. Preferably, the ribs 30 and drum 12 are integrally formed together as a single piece. The ribs 30 and recesses 32 are also preferably defined by arcuate surfaces to form a sinusoidal cross-sectional shape, shown in FIG. 1.

Figure 2:
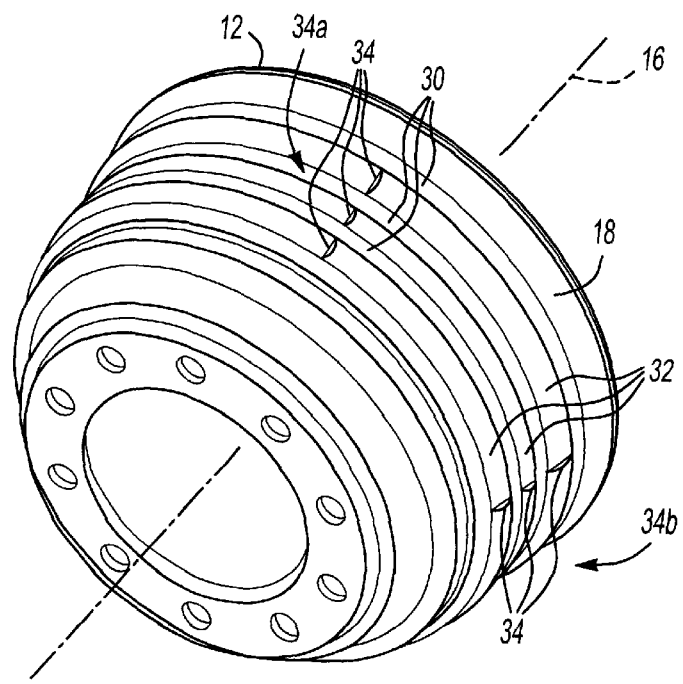
FIG. 2 is a perspective view of the brake assembly of FIG. 1.

In order to more effectively dissipate heat generated during braking, the subject invention positions fins, inserts, or wedges 34 within the recesses 32 between the ribs 30. In one embodiment, at least one wedge 34 is inserted in each recess 32, however, in the preferred embodiment, multiple wedges 34 are installed within each recess 32, as shown in FIG. 2. The wedges 34 preferably contact at least a portion of each adjacent rib 30.

Preferably, the wedges 34 are half-mooned shaped to generally fill the recess 32 between adjacent ribs 30, however, other shapes could also be used. Further, the wedges 34 can be secured within the recesses 32, between the ribs 30, by any joining method known in the art such as by welding for example.

The wedges 34 are secured between the ribs 30 to direct air flowing around the rotating drum 12 outwardly from the recesses 32 and away from the drum 12. This provides a more rapid heat transfer from the drum 12 to the atmosphere to reduce heat cracking in the areas between the ribs 30.

The number of wedges 34 installed within the recesses can vary from recess 32 to recess 32 or can be the same for each recess. Further the wedges 34 can be installed at multiple locations about the periphery of the drum. For example, as shown in FIG. 2, a first group of wedges 34a is installed at a first position and a second group of wedges 34b is installed at a second position that is arcuately spaced from the first position. It should be understood that the number of wedges 34 needed to effectively dissipate heat could vary depending upon the vehicle application.

Figure 3:
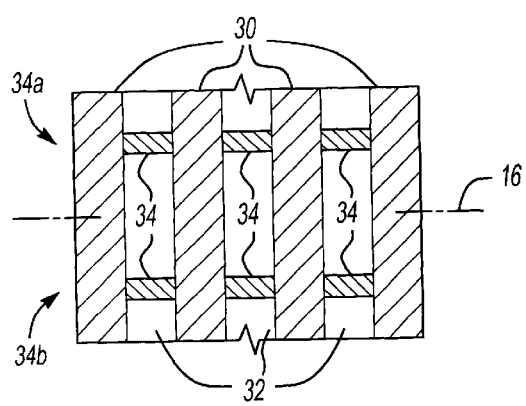
FIG. 3 shows one embodiment of an insert pattern.

The wedges 34 can also be installed in the recesses 32 in various different patterns. For example, as shown in FIG. 3, the wedges 34 can be installed next to each other along a coplanar or collinear path. In this configuration, the first group of wedges 34a would be coplanar or define edges that are collinear with adjacent wedges 34 in the same group 34a and the second group of wedges 34b would be coplanar or define edges that are collinear with adjacent wedges 34 in the same group 34b.

Figure 4:
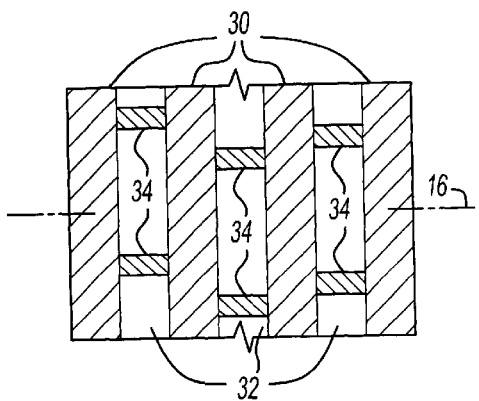
FIG. 4 shows another embodiment of an insert pattern.

In another example shown in FIG. 4, the wedges 34 are installed in a staggered pattern such that adjacent wedges 34 are not coplanar. The patterns shown in FIGS. 3 and 4 can be used separately or a combination of the two (2) different patterns could be used together. Also, it should be understood that other wedge patterns could also be used either alone or in combination with the patterns described above. Please note that FIGS. 3 and 4 show a partial section of the ribs 30 and recesses 32 in a flattened orientation simply for descriptive purposes relating to position of the wedges 34.

Figure 5:
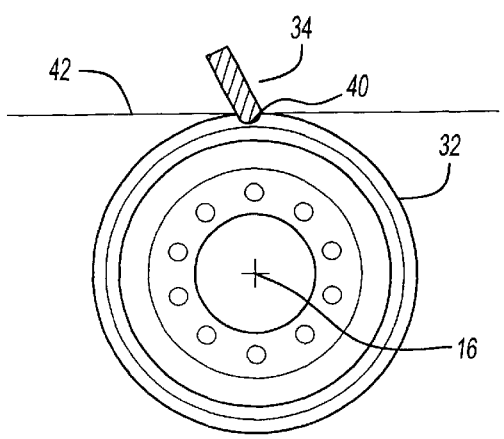
FIG. 5 shows one embodiment of an insert installation position.
Figure 6:
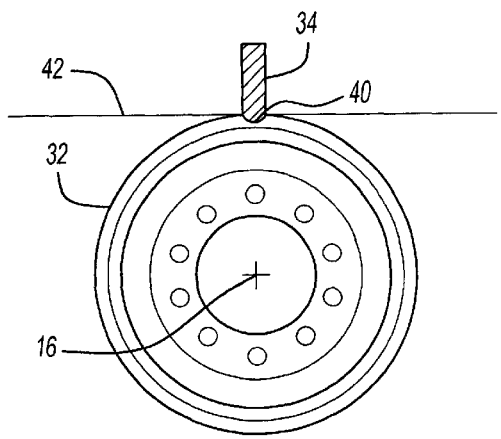
FIG. 6 shows another embodiment of an insert installation position.

As shown in FIGS. 5 and 6, each wedge 34 and recess 32 cooperates to define a base point 40. The wedge 34 can be positioned at an oblique angle relative to a tangent line 42 extending through the base point to as shown in FIG. 5, or can be positioned at a perpendicular angle relative to the tangent line 42.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A brake assembly comprising:
   a rotating brake member defining an axis of rotation and presenting and outer surface and an inner surface for selective engagement with a non-rotating brake member;
   a plurality of ribs formed about the periphery of said outer surface with each of said ribs being spaced apart from each other to define a plurality of recesses between said ribs; and
   at least one insert positioned within one of said recesses for directing air flow away from said outer surface as said rotating brake member rotates about said axis of rotation.

2. An assembly according to claim 1 wherein each of said ribs and recesses extend about the circumference in an unbroken formation.

3. An assembly according to claim 2 wherein each of said ribs is defined by a first diameter and each of said recesses is defined by a second diameter less than said first diameter.

4. An assembly according to claim 1 wherein each of said ribs includes a distal portion located at a first radial distance from said axis of rotation and wherein each of said recesses includes a base portion located at a second radial distance from said axis of rotation with said first radial distance being greater than said second radial distance.

5. An assembly according to claim 1 wherein at least one insert comprises a plurality of inserts with at least one insert being positioned within each of said recesses.

6. An assembly according to claim 5 wherein inserts positioned in adjacent recesses are coplanar.

7. An assembly according to claim 5 wherein inserts positioned in adjacent recesses are non-coplanar.

8. An assembly according to claim 1 wherein at least one insert comprises a plurality of inserts with multiple inserts being positioned within each of said recesses.

9. An assembly according to claim 8 wherein said plurality of inserts includes at least a first set of inserts positioned at a first position about the circumference of said outer surface and a second set of inserts positioned at a second position arcuately spaced apart from said first position.

10. An assembly according to claim 8 wherein said first set of inserts presents a first set of collinear upper edges to define a first line and said second set of inserts presents a second set of collinear edges to define a second line that is arcuately spaced apart from said first line relative to said axis of rotation.

11. An assembly according to claim 1 wherein said insert and said recess cooperate to define a base point with said insert being positioned at an oblique angle relative to a tangent line extending through said base point.

12. An assembly according to claim 1 wherein said insert and said recess cooperate to define a base point with said insert being positioned at a perpendicular angle relative to a tangent line extending through said base point.

13. An assembly according to claim 1 wherein said rotating member comprises a brake drum formed from a composite material.

14. A brake drum assembly comprising:
   a brake drum defining an axis of rotation and presenting and outer surface and an inner surface for selective engagement with a non-rotating brake member;
   a plurality of ribs formed about the circumference of said outer surface with each of said ribs being spaced apart from each other in a generally linear direction extending along said axis of rotation;
   a plurality of grooves formed about the circumference of said outer surface with said grooves being spaced apart from each other in a generally linear direction extending along said axis of rotation and positioned between adjacent ribs; and
   a plurality of wedges with at least one wedge being positioned within each of said recesses, said wedges for directing air flow outwardly from said grooves and away from said outer surface as said brake drum rotates about said axis of rotation.

15. An assembly according to claim 14 wherein said plurality of wedges includes at least a first set of wedges positioned at a first location on said outer surface and a second set of wedges positioned at a second location arcuately spaced apart from said first location.

16. An assembly according to claim 15 wherein said first set of wedges is coplanar and said second set of wedges is coplanar.

17. An assembly according to claim 14 wherein each of said wedges and said corresponding groove cooperate to define a base point with said wedge being positioned at an oblique angle relative to a tangent line extending through said base point.

18. An assembly according to claim 14 wherein each of said wedges and said corresponding groove cooperate to define a base point with said wedge being positioned at a perpendicular angle relative to a tangent line extending through said base point.

19. A method for directing air flow away from an outer surface of a rotating brake drum comprising the steps of:
   (a) forming a plurality of ribs on the outer surface that extend continuously about the circumference of the brake drum;
   (b) forming a plurality of recesses between the ribs; and
   (c) inserting at least one wedge member in each of the recesses to direct air flow outwardly from the groove and away from the outer surface of the rotating brake drum.

20. A method according to claim 19 including the step of forming the ribs and recesses with arcuate surfaces and forming the wedge with a corresponding arcuate surface.

* * * * *